C. C. FOUTS.
SUPPORTING DEVICE FOR CARBOYS AND THE LIKE.
APPLICATION FILED MAY 7, 1919.

1,403,023.

Patented Jan. 10, 1922.
2 SHEETS—SHEET 1.

INVENTOR.
C. C. Fouts
BY
ATTORNEY.

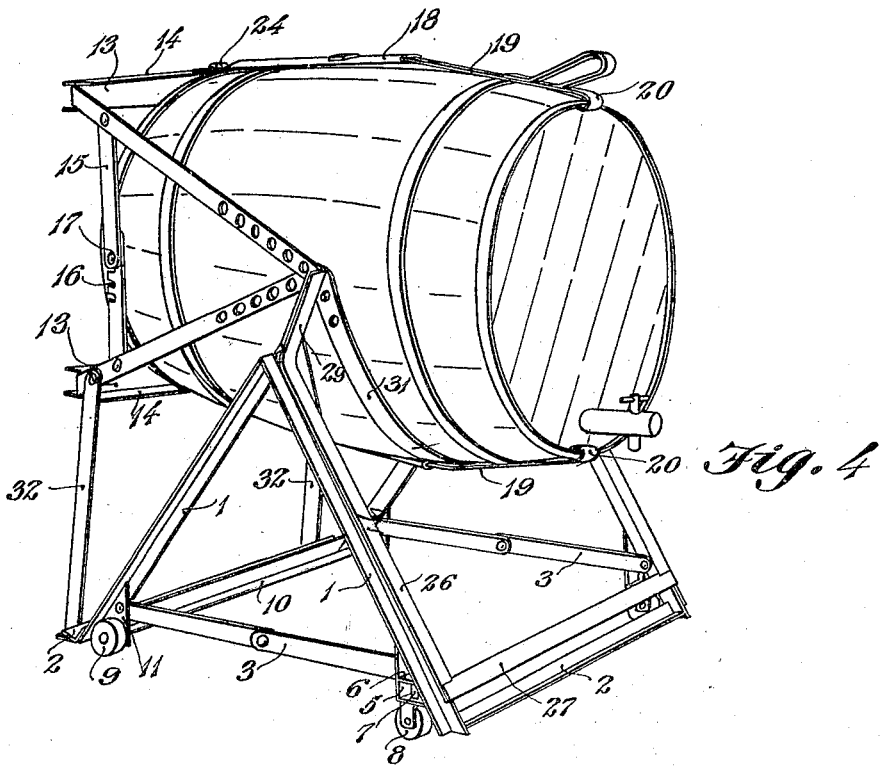

UNITED STATES PATENT OFFICE.

CALVIN C. FOUTS, OF MIDDLETOWN, OHIO.

SUPPORTING DEVICE FOR CARBOYS AND THE LIKE.

1,403,023.  Specification of Letters Patent.  Patented Jan. 10, 1922.

Application filed May 7, 1919. Serial No. 295,388.

*To all whom it may concern:*

Be it known that I, CALVIN C. FOUTS, a citizen of the United States, residing at Middletown, in the county of Butler and State of Ohio, have invented certain new and useful Improvements in Supporting Devices for Carboys and the like, of which the following is a specification, reference being had therein to the accompanying drawing.

This invention relates to a supporting device for carboys and the like.

The object of the invention is to provide a device of this kind in which a carboy or other container may be mounted and tilted to enable its contents to be drawn off in such quantities as may be desired; and which will be of such a character that the tilting of the container may be easily accomplished and controlled, so that the liability of spilling any part of the contents of the container is reduced to a minimum.

A further object of the invention is to provide such a device which may be collapsed for storage or shipment.

A further object of the invention is to provide such a device in which the container may be tilted to a substantially horizontal position and retained in that position.

A further object of the invention is to provide such a device which will be simple in its construction and operation and of a strong, durable character.

Other objects of the invention will appear as the mechanism is described in detail.

Figure 1:
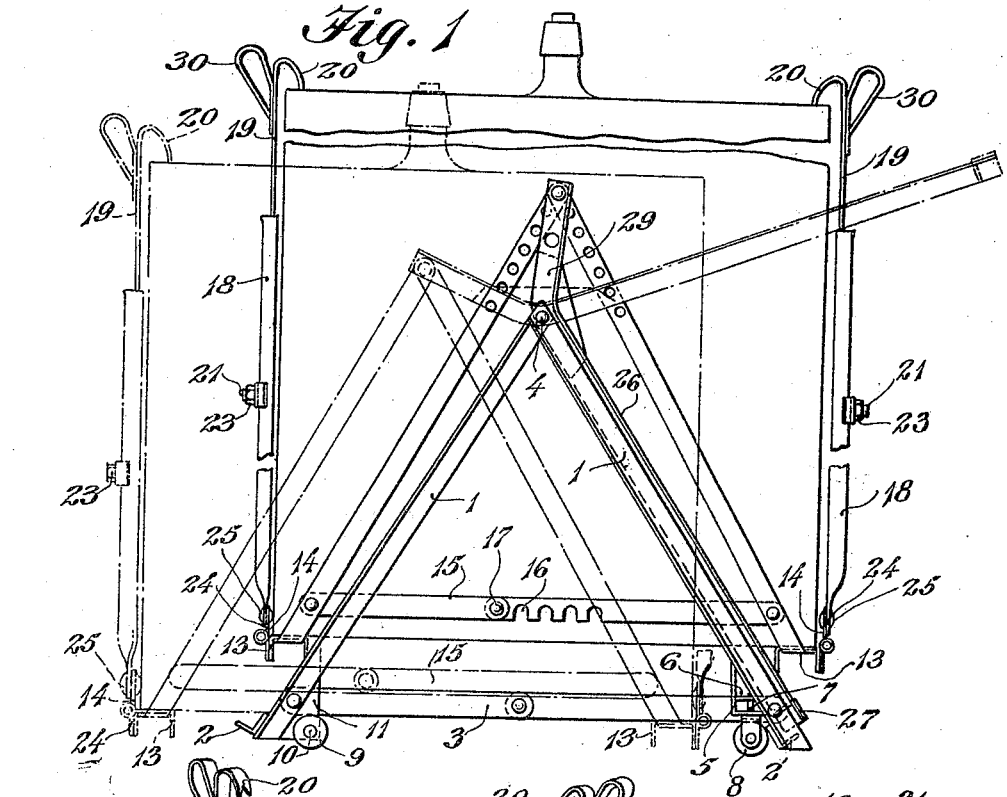
Figure 3:
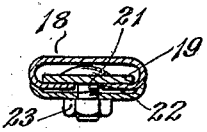
Figure 2:
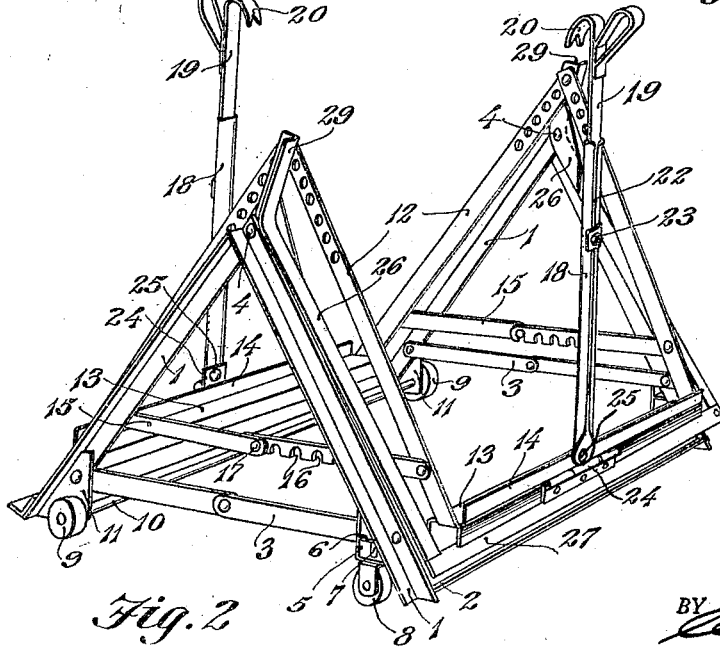

In the accompanying drawings Fig. 1 is a side elevation of a device embodying my invention, showing a carboy mounted therein; Fig. 2 is a perspective view of such a device; Fig. 3 is a sectional detail view taken through one of the clamping bars; Fig. 4 is a perspective view of a slightly modified form of the invention; and Fig. 5 is a detail view of the swiveled caster.

In these drawings I have illustrated one embodiment of my invention and have shown the same as comprising a supporting structure or frame which consists of two side members 1, each of which, in that form of the device here shown, comprises an inverted V-shaped structure, the parallel arms of the two side frames being rigidly connected one to the other near their lower ends by means of a transverse bar 2. The two arms of each V-shaped member of the frame are braced one against the other by a connecting bar 3 which is secured at its ends to the respective arms near their lower ends. In order that the device may be collapsible, to permit it to be folded into compact form for shipping or storage, I have shown the two arms of each V-shaped frame member as pivotally connected at their upper ends as shown at 4, and I have made the connecting bar or brace 3 in the form of a toggle which will permit the two arms of the frame member to be folded one against the other but which, in its extended position, will form a firm, rigid connection between the two parts. Preferably the device is mounted on casters to permit it to be readily moved from one position to another, and in the construction here shown I have placed a caster at each corner of the supporting frame. The casters at the rear end of the frame are preferably swiveled and to this end the rear arm of each V-shaped side member of the frame has secured thereto near its lower end an angle bracket 5 which may be welded or otherwise secured to the frame member, and which is so arranged that the lower portion of the bracket will extend in a substantially horizontal position when the supporting frame is in its extended position. Arranged between the upright member of the bracket and the arm of the frame member is a plate 6 which is parallel with the lower portion of the bracket and cooperates therewith to form a bearing for the spindle 7 of a caster 8. If desired, all four casters may be swiveled but, as here shown, the casters at the forward end of the supporting frame are not swiveled but are in the form of rollers 9 mounted on the respective ends of a rod or axle 10 which is journaled in bearing plates 11 rigidly secured to the forward arms of the respective side members of the supporting frame. The frame may be constructed of any suitable material, but I have here shown the frame members as formed of angle iron, which provides the necessary strength without unnecessary weight.

Mounted upon the supporting frame is a swinging frame which is adapted to receive the container and to be rocked about its pivotal support to permit said container to be tilted. Preferably, this swinging frame is mounted for vertical movement as well as swinging movement, to facilitate the mounting of the container thereon. In the construction here shown, the swinging frame also consists of side members of an inverted V-shape and the parallel arms of the side members of the swinging frame are rigidly connected one to the other at their lower ends by means of connecting bars 13. In the present construction the side members of the swinging frame are formed of flat bars, pivotally connected at their upper ends, and the connecting members 13 are formed of channel iron, with the flanges turned downwardly, so as to provide a flat supporting surface for the container which will have the necessary strength. Extending upwardly from the outer edge of each of the connecting members 13 is a flange 14, which flanges engage the sides of the container and hold the same against lateral displacement. The two arms of each of the side members of the swinging frame are also connected one to the other by means of a toggle 15, which permits them to be folded one against the other and these toggles are preferably extensible to accommodate the frame to containers of different sizes. To this end one arm of each toggle 15 is provided with a series of notches 16 adapted to receive a pin 17 carried by the other arm of the toggle. The swinging frame is provided with suitable holding devices, which are here shown as telescoping bars extending upwardly from the respective connecting bars 13 of the swinging frame. The lower or hollow member 18 of each holding bar is secured at its lower end to the adjacent connecting bar 13 of the swinging frame, and has mounted therein the upper member 19 of the extensible bar. The upper or slidable member 19 has its upper end bent inwardly and downwardly, as shown at 20, to overhang the edge of the container and adapted to be forced into firm engagement therewith. A bolt 21 extends through the slidable member 19 and through a slot 22 in the hollow member, and is provided on its outer end with a nut 23 by means of which the two members may be locked against relative movement, and the container thus firmly secured to the swinging frame. In order that the clamping bars or the holding devices may be moved out of the way when the container is being placed on, or is moved from, the swinging frame they are preferably pivoted to the swinging frame and as here shown, the lower member 18 of each clamping bar is connected to the swinging frame by means of a hinge 24 having its axis extending parallel with the connecting bar 13. If desired, the member 18 may be pivotally connected to the upper leaf of the hinge on an axis extending transversely to the axis of the hinge, as shown at 25, thus enabling the clamping bar to be moved into position substantially parallel with the connecting bar 13 of the swinging frame.

As has been stated, the swinging frame is preferably mounted on the supporting structure for vertical movement as well as for swinging movement and, to this end, it is carried by a suitable lifting device. This lifting device may take various forms but, as here shown, it is a lever like construction comprising a pair of arms or levers 26 pivotally connected at points between their ends with the respective side members of the supporting frame, the connection being preferably formed by the pivot pins 4, by means of which the two arms of each side member are connected one to the other. The two arms of the lifting device are connected at their outer ends by means of a connecting bar 27, and these arms are of such a length that when in a normal position they will lie parallel with the corresponding arms of the respective side members and the connecting bar 27 will lie parallel with and close to the connecting bar 2 of the supporting frame. The two arms of the lifting device are preferably bent adjacent to their axes, after the manner of a bell crank lever, and the swinging frame is pivotally mounted on the short arms of these levers, the connection being here shown as formed by the pins which connect the two arms of the respective V-shaped frames one to the other. The short arms 29 of the lifting device are bent at such an angle to the longer arms or main portion of the structure, 26, that when the lifting device is in its normal position the rear ends of the arms and, consequently, the point of connection of the swinging frame with the lifting device will be slightly in the rear of the axis about which the lifting device moves and, consequently, the weight of the container will tend to hold the lifting device in its normal position.

When it is desired to place a container on the swinging frame the lifting device 26 is moved about its axis to lower the swinging frame into the position shown in dotted lines in Fig. 1. The clamping bar is then moved out of the way and the carboy, or other container, lifted into position on the swinging frame, 1, after which the gripping ends of the clamping bars are brought into engagement with the container and clamped in position. The lifting device is then returned to its normal position, thereby lifting the swinging frame and the carboy into the position shown in full lines in Fig. 1. In this position the swinging frame is free to swing about its pivotal connection with the lifting device and the carboy, or other container, may thus be tilted to the desired angle to pour the contents therefrom. If desired, one or both of the clamping bars may be provided with handles or gripping devices to facilitate the tilting of the container.

The device is adapted to handle containers of various kinds with little or no modification, but in the case of some containers it may be desirable to make minor changes in, or additions to, the mechanism to adapt it to the particular character of the container. In the case of a barrel it is frequently desired to tilt the barrel to a substantially horizontal position and retain it in that position while its contents are drawn off through a spigot. In Fig. 4 I have shown a slightly modified form of the device, which is particularly adapted for handling barrels. The construction of this device is exactly the same as shown in Figs. 1 and 2, but it has added thereto a supporting band 31 which is connected to the swinging frame, preferably at the points of connection of that frame to the lifting device, and extends about one side of the barrel near the upper end thereof so as to form an additional support therefor and thus relieve the clamping bars of a portion of the strain. Connected with the swinging frame, near the lower end thereof, are pivoted standards or legs 32 which can be moved into an upright position, as shown in Fig. 4, when the barrel has been moved to a horizontal position, and will then serve to hold the barrel in that position. The band 31 may be made adjustable to accommodate it to containers of different sizes by providing its end portions with a series of openings or bolt holes, by means of which it may be connected in different positions with the swinging frame.

The operation of the device will be readily understood from the foregoing description of the several parts thereof, and it will be apparent that I have provided a device of this character which is very simple in its construction and operation; which is of a strong, durable character; and which can be easily manipulated to tilt the container. It will also be apparent that the device is of such a character that the container can be easily mounted thereon and elevated into a position in which it is free to swing; and further, it will be apparent that the device is of such a character that it can be collapsed or folded into a compact form for storage or shipment.

While I have shown and described one embodiment of the invention, I wish it to be understood that I do not desire to be limited to the details thereof, as various modifications will occur to a person skilled in the art.

Having thus fully described my invention, what I claim as new and desire to secure by Letters Patent is:

1. In a device of the character described, a main frame comprising side members spaced apart and rigidly connected one to the other at their lower ends, a swinging frame comprising two side members pivotally supported at their upper ends on said main frame and transverse members connecting the lower ends of said side members of said swinging frame and forming a support for a container, said swinging frame being arranged to rest upon the floor and having one side open to permit said container to be placed on said supporting members, means carried by said swinging frame adjacent to, but movable away from, the open side thereof for securing said container in position on said supporting members, and means for lifting said swinging frame off the floor to permit it to have swinging movement.

2. In a device of the character described, a main frame comprising side members spaced apart and rigidly connected one to the other at their lower ends, a swinging frame comprising side members pivotally supported by said main frame and transverse members connecting the lower ends of the side members of said swinging frame and forming a support for a container, said swinging frame being arranged to rest upon the floor and having one side open to permit said container to be placed on said supporting members, a clamping bar pivotally mounted on the transverse member of said swinging frame at the open side thereof to secure said container in position thereon, and means for lifting said swinging frame off the floor to permit it to have swinging movement.

3. In a device of the character described, a main frame comprising side members spaced apart and rigidly connected one to the other at their lower ends, a swinging frame comprising side members pivotally supported by said main frame and transverse members connecting the lower ends of the side members of said swinging frame and forming a support for a container, said swinging frame being arranged to rest upon the floor and having both its front and rear sides open to permit a container to be placed on, or removed from, said supporting members, clamping bars pivotally mounted on the transverse members of said swinging frame at the open side thereof to engage the upper edges of said container and secure the same in position thereon, and means for lifting said swinging frame off the floor to permit it to have swinging movement.

4. In a device of the character described, a main frame comprising side members spaced apart and rigidly connected one to the other, each side member comprising two parts pivotally connected one to the other and adapted to be moved into approximately parallel positions, a lifting device mounted on said side members near the upper ends thereof, a swinging frame comprising side members pivotally supported at their upper ends by said lifting device and transverse members connecting the lower ends of the side members of said swinging frame and forming a support for a container, each side member comprising two parts pivotally connected one to the other at their upper ends, and an adjustable toggle connecting the two parts of said side members near the lower ends to retain them normally in spaced relation, and adjustable clamping bars mounted on the transverse members of said swinging frame to secure a container in position thereon.

5. In a device of the character described, a supporting structure, a tiltable frame mounted on said structure and adapted to receive a container, a holding bar mounted on said frame and adapted to operatively engage said container, a hinge to connect said holding bar with said frame, and a pivotal connection between said holding bar and said hinge, said connection being about an axis transverse to the axis of said hinge.

6. In a device of the character described, a supporting frame comprising substantially V-shaped side members, the parallel arms of said V-shaped side members being rigidly connected one to the other near their lower ends, and the arms of each side member being pivotally connected one to the other at their upper ends, a toggle arranged between the lower ends of said arms, a lifting device mounted on said supporting structure, and a collapsible frame pivotally mounted on said lifting device and adapted, when in its extended position, to receive a container.

In testimony whereof, I affix my signature hereto.

CALVIN C. FOUTS.